United States Patent [19]
Spector

[11] Patent Number: 5,813,896
[45] Date of Patent: Sep. 29, 1998

[54] COLLAPSIBLE STUFFED TOY FIGURES

[76] Inventor: Donald Spector, 380 Mountain Rd., Union City, N.J. 07080

[21] Appl. No.: 840,655

[22] Filed: Apr. 25, 1997

[51] Int. Cl.$^6$ ........................................... A63H 3/06
[52] U.S. Cl. .................................. 446/221; 446/226
[58] Field of Search .............................. 473/596; 446/221, 446/223, 226

[56] References Cited

U.S. PATENT DOCUMENTS

| | | | |
|---|---|---|---|
| 2,685,758 | 8/1954 | Ochs | 446/223 |
| 5,577,732 | 11/1996 | Spector | 473/594 X |
| 5,613,892 | 3/1997 | Barton | 446/226 |
| 5,649,875 | 7/1997 | Spector | 473/596 |

FOREIGN PATENT DOCUMENTS

| | | | |
|---|---|---|---|
| 8118 | of 1915 | United Kingdom | 446/226 |
| 941546 | 11/1963 | United Kingdom | 446/226 |

*Primary Examiner*—William H. Grieb
*Attorney, Agent, or Firm*—Michael Ebert

[57] ABSTRACT

A fabric-covered stuffed toy figure having a head hinged by a flexible neck to a torso to which are hinged arm and leg appendages. The fabric casing of the head is stuffed by an inflated balloon and the fabric casing of the torso is stuffed by another balloon, whereas the fabric sleeves of the appendages are stuffed by compressible padding. To facilitate packaging, storage and shipment, the figure can be collapsed by deflating the balloons, thereby flattening the head and torso, after which the hinged appendages may be folded over the flattened torso to reduce the space occupied by the figure.

7 Claims, 2 Drawing Sheets

U.S. Patent    Sep. 29, 1998    Sheet 2 of 2    5,813,896
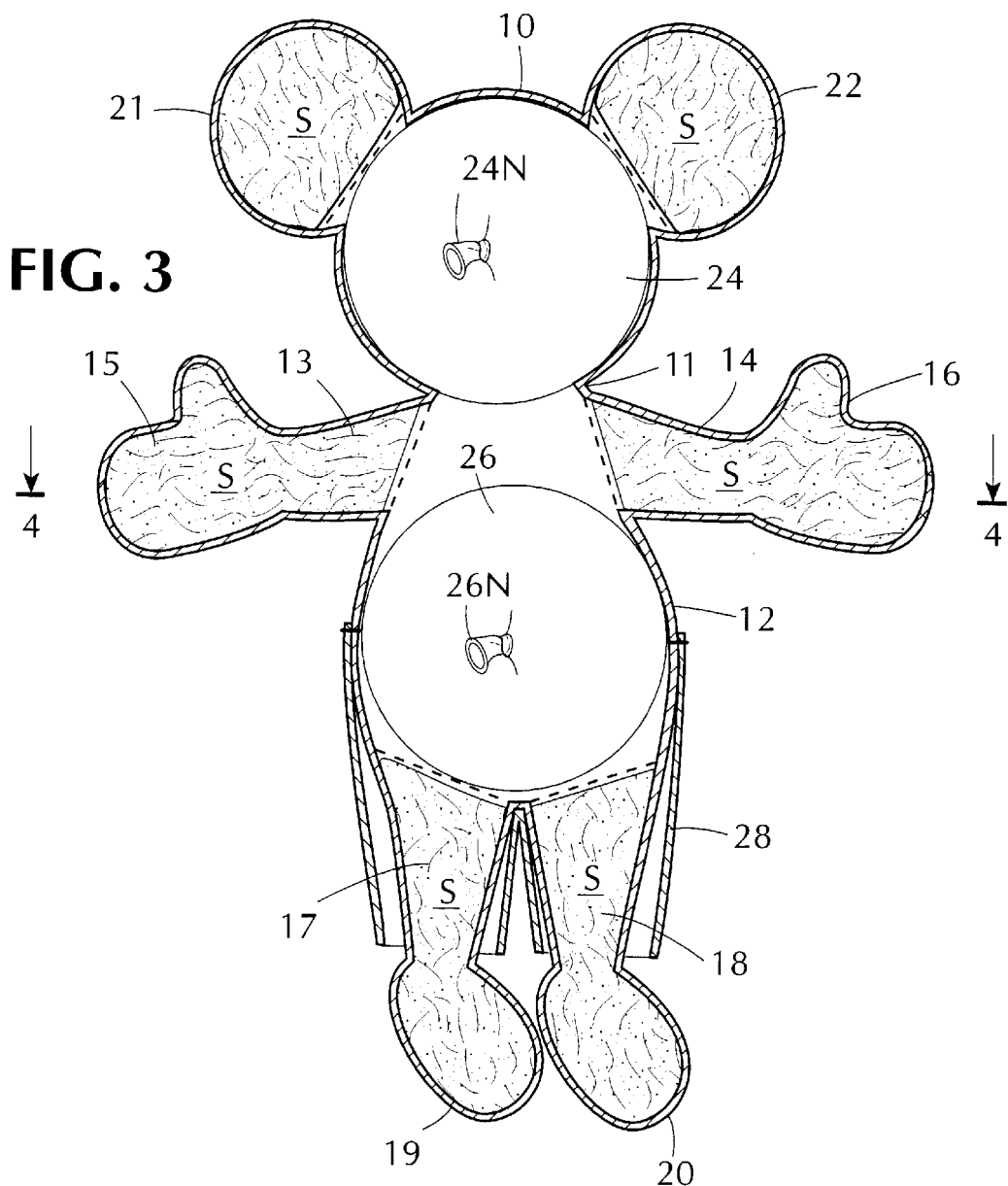
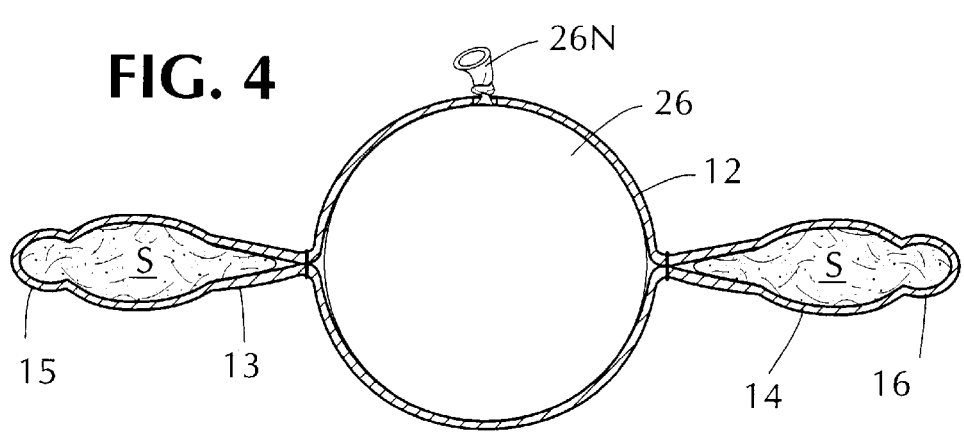

COLLAPSIBLE STUFFED TOY FIGURES

RELATED APPLICATION

This application is a continuation-in-part of the Spector application Ser. No. 08/673,506 filed Jul. 1, 1996, (now U.S. Pat. No. 5,649,875) entitled "HUMANOID TOY MISSILE."

BACKGROUND OF THE INVENTION

1. Field of Invention

This invention relates generally to fabric-covered toy figures which are soft and compressible, and more particularly to a collapsible figure of this type whose head and torso are each stuffed with an inflated balloon, the arm and leg appendages extending from the torso being stuffed with padding, so that the figure may be collapsed by deflating the balloons.

2. Status of Prior Art

Toy figures, such as dolls, have a head joined by a neck to a torso from which extend arm and leg appendages. Toy figures are universally popular with children, these figures representing one of the oldest type of toy in use throughout the world.

Toy figures which are especially appealing to youngsters are stuffed figures, such as a Teddy Bear which is a toy bear stuffed with soft material, typically cotton batting covered with a fur-like plush fabric. Because a stuffed toy figure is soft and compressible, a child is able to hug and squeeze the figure as he would a pet. Indeed, stuffed toy figures are often adopted as pets by children.

A conventional stuffed toy figure having a form resembling say Mickey Mouse or another Disney character presents practical problems, particularly when the figure is fairly large, for example 15 inches long from head to toe. The first problem is that of manufacturing cost, for a figure of this size dictates that all of its components be stuffed with cotton batting or a similar compressible material. Since both the head and torso of the figure have a relatively large volume which must be filled with padding, the cost of the required stuffing is rather high, even though the padding requirements for the arm and leg appendages are small.

But quite apart from high manufacturing costs, with a large stuffed toy figure one is faced with high packaging storage and shipping costs. A conventional stuffed figure cannot be reduced in weight nor can it be collapsed in order to be compactly packaged; hence it must be put in a box dimensioned to accommodate the full figure. The larger the box, the greater is the necessary storage space, and the more it costs to ship.

Another drawback of a conventional stuffed toy figure contained in a large box is that when put on a shelf in a retail store, it then occupies a substantial amount of shelf space. Because of the many other toys carried by a typical retail toy store, shelf space is at a premium. Hence a retail store may be reluctant to carry the large stuffed toy figure, for to do so might be at the expense of other toys whose shelf space is taken away by the box containing the large stuffed figure.

Still another factor which discourages the sale of large fabric covered stuffed toy figures is that they are difficult to launder. In the course of play, such figures may become badly soiled and therefore unsuitable for further play. Yet a stuffed toy figure, all of whose components are stuffed with cotton batting or other highly absorbent padding, is not easily laundered in a washing machine, for large amounts of water are absorbed by the padding, which cannot readily be dried out. A moist padding in a stuffed toy figure is a haven for germs.

In a stuffed toy figure in accordance with the invention, major components of the figure are each stuffed with an inflated balloon which renders the component soft and compressible. Of prior art interest in this regard is the Ochs U.S. Pat. No. 2,685,758 entitled Humpty Dumpty Inflatable Toy.

The Ochs toy is formed by an outer fabric casing which assumes an oval form when stuffed with an inflated balloon, the face of Humpty Dumpty being printed on the fabric casing. Extending from this casing are fabric arms and legs stuffed with cotton batting.

The Ochs toy does not resemble a true humanoid figure, for there is no head joined by a neck to a torso, as in a real figure, but only a face painted on an egg-shaped fabric casing.

Of background interest is the humanoid figure disclosed in the above-identified copending Spector application in which a plastic casing stuffed by an inflated balloon has printed on its front face the head and torso of the figure. Extending from the plastic casing are plastic film pockets, each stuffed with a compressible foam to define the arm and leg appendages of the figure.

SUMMARY OF INVENTION

In view of the foregoing, the main object of this invention is to provide a fabric covered toy figure whose head and torso are each stuffed with an inflated balloon whereby the figure may be collapsed by deflating the balloons.

More particularly, an object of this invention is to provide a collapsible toy figure of the above type which in the collapsed state can be folded into a compact form to reduce packaging, storage and shipment costs.

Also an object of this invention is to provide a stuffed toy figure that can be mass produced at a significantly lower cost than a toy figure all of whose components are stuffed with padding.

Briefly stated, these objects are attained in a fabric-covered stuffed toy figure having a head hinged by a flexible neck to a torso to which are hinged arm and leg appendages. The fabric casing of the head is stuffed by an inflated balloon and the fabric casing of the torso is stuffed by another balloon, whereas the fabric sleeves of the appendages are stuffed by compressible padding. To facilitate packaging, storage and shipment, the figure is collapsed by deflating the balloons, thereby flattening the head and torso, after which the hinged appendages may be folded over the flattened torso to reduce the space occupied by the figure.

BRIEF DESCRIPTION OF DRAWING

For a better understanding of the invention as well as other objects and further features thereof, reference is made to the following detailed description to be read in conjunction with the accompanying drawings, wherein:

FIG. 3 is longitudinal section taken through the figure; and

FIG. 4 is a transverse section taken in the plane indicated by line 4—4 in FIG. 3.

DESCRIPTION OF INVENTION

Figure 1:
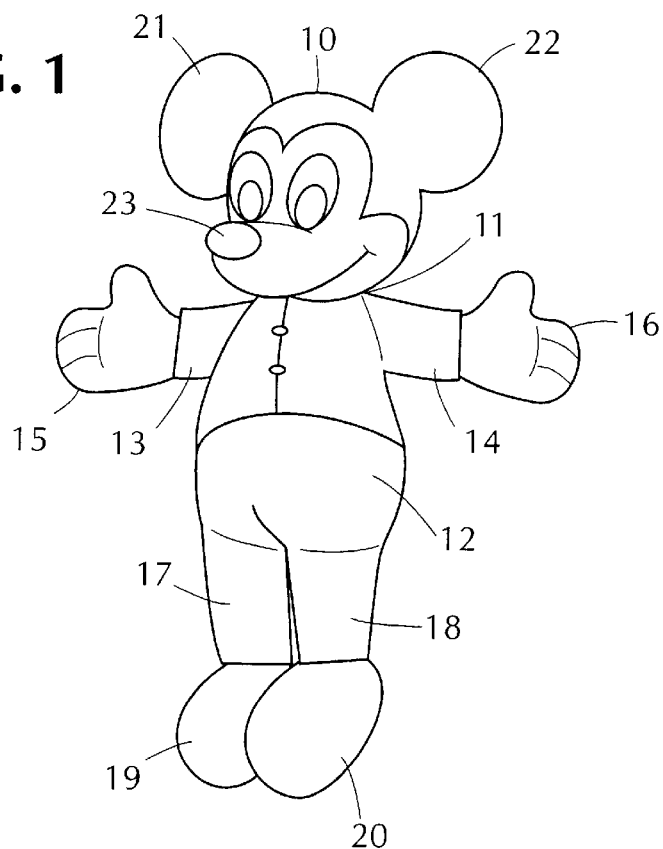
FIG. 1 is a front view in perspective of a collapsible stuffing toy figure in accordance with the invention.
Figure 2:
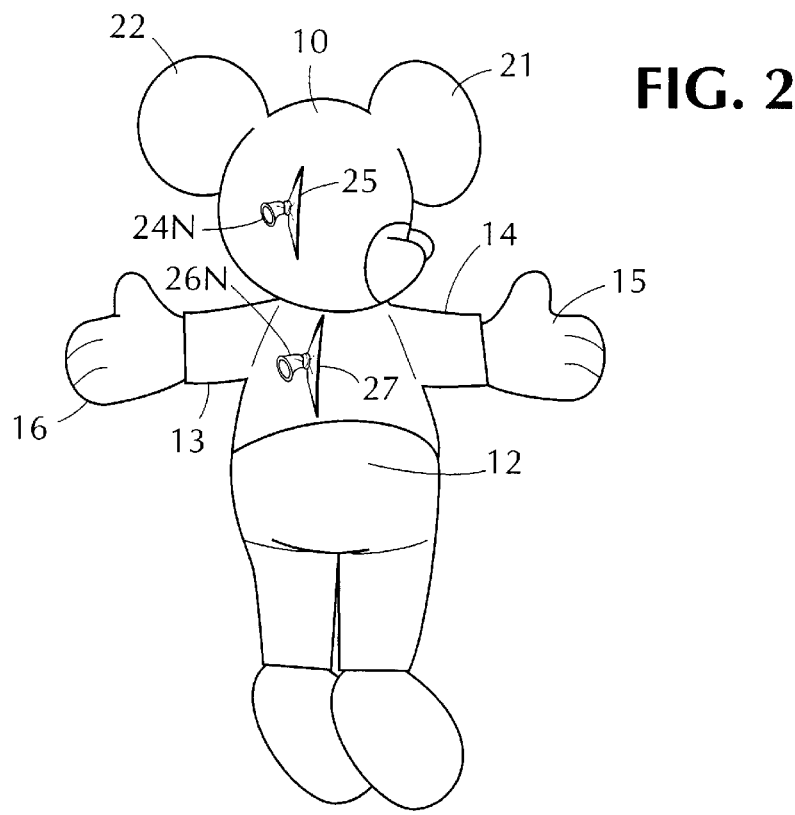
FIG. 2 is a rear view of this figure.

The fabric-covered stuffed toy figure shown in FIGS. 1 to 4 by way of example is made to somewhat resemble the familiar Disney character Mickey Mouse and therefore is a cross between a human and a mouse.

The term "stuffed" as used herein refers to any filling whether in the form of compressible material which fills a portion of the figure or of an inflated balloon which fills another portion.

The figure illustrated includes a head 10 hinged by a neck 11 to a torso 12 from whose shoulders extend arm appendages 13 and 14 terminating in hands 15 and 16. Extending from the crotch of the torso are leg appendages 17 and 18 terminating in feet 19 and 20.

Because the figure resembles Mickey Mouse, the head is also provided with a pair of large ears 21 and 22 and a protruding nose 23.

The entire figure, as best seen in FIG. 3, is encased in a fabric casing which is contoured to define all of the components of the figure. The casing may be made of plush fabric, as in a stuffed Teddy Bear, or of any other suitable fiber fabric that is contour-cut and sewed to define the casing.

Ears 21 and 22 of the head are stuffed with compressible material S, such as cotton batting or flexible foam plastic material. Also stuffed with material S (not shown) is the protruding nose 23, the arms and hands 14–16 and 13–15, and the legs and feet 17–19 and 18–20.

But the portions of the stuffed figure which account for most of the volume of the figure and not stuffed with padding but by inflated balloon. Thus head 10 is filled with an inflated rubber balloon 24 whose neck 24N projects through a slit 25 in the portion of the casing defining the head, the neck being tied to seal the balloon after it is mouth-inflated.

When the balloon 24 is inflated, it conforms to the contours of the fabric casing defining head 10, hence the shape of the head is determined by the shape of the fabric casing, not by that of the balloon which when inflated, without being confined, assumes a globular shape.

It is important to bear in mind that when a balloon is inflated within a confined shape, its skin is then stretched to conform to the contours of the space. Thus if a balloon is inflated within a football shaped casing, it will, when inflated, assume the shape of this football, while if it is inflated in a spherical casing it will assume that shape. Hence whatever the shape of head 10, balloon 24 will assume that shape.

Filling torso 12 is an inflated balloon 26 whose neck 26N projects through a slit 27 in the casing portion forming the torso, and is tied to seal the balloon.

While in FIG. 3 balloon 26 is shown inflated to assume a spherical shape, actually it assumes the contours of the torso 12 and conforms to the inner wall of the torso.

Attached to torso 12 about its waist is a fabric skirt 28, as shown in FIG. 3, whose only purpose is decorative, the skirt being omitted in the other figures.

The advantage of using balloons to fill out the torso and head of the figure is that it is less expensive to make than to fill these large volume components with compressible padding. But the more important advantage of the balloons is that they render the stuffed figure collapsible so that the figure can occupy much less space when packaged, stored and shipped.

In the absence of the balloons, both head 10 and torso 12 can be flattened and the stuffed arm and leg appendages can be folded over the flat torso, and the flat head 10 hinged to the torso can be folded to greatly reduce the volume occupied by the figure.

In this way, the figure can be packaged in a relatively small box, and it is only when the figure is taken out of the box that the balloons are put therein and inflated to cause the figure to assume its full three-dimensional long form.

In the absence of the balloons, the filling in the fabric covered figure is mainly in the appendages. Hence it becomes feasible to clean the figure in a standard washing machine, for the amount of water absorbed in the stuffing in the appendages is relatively small and can easily be squeezed out.

While there has been shown and described a preferred embodiment of a collapsible stuffed toy figure in accordance with the invention, it will be appreciated that many changes and modifications may be made therein without, however, departing from the essential spirit thereof.

I claim:

1. A toy figure comprising:

A. a fabric casing shaped to define a figure having a head, a torso, a neck hinging the head to the torso and arm and leg appendages hinged to the torso;

B. compressible stuffing in the appendages to impart a three-dimensional form thereto;

C. a balloon inflated in the head to impart a three dimensional form thereto, said head having a slit therein to receive the balloon in a deflated state with a neck of the balloon projecting through the slit to permit inflation thereof; and D. a balloon inflated in the torso to impart a three dimensional form thereto, said torso having a slit therein to receive the balloon in a deflated state with a neck of the balloon protecting throughout slit to permit inflation thereof whereby by omitting the balloons from the head and the torso, the figure may be collapsed and flattened, with the appendages folded over the flat torso and the flat head folded thereover to assume a more compact form suitable for packaging.

2. A toy figure as set forth in claim 1, in which the head is provided with a pair of stuffed ears and with a stuffed projecting nose.

3. A toy figure as set forth in claim 1, in which the arm appendages terminate in stuffed hands.

4. A toy figure as set forth in claim 1, in which the leg appendages terminate in stuffed feet.

5. A toy figure as set forth in claim 1, in which the stuffing is cotton batting.

6. A toy figure as set forth in claim 1, in which the stuffing is flexible foam plastic material.

7. A toy figure as set forth in claim 1, in which the fabric is a plush fabric.

* * * * *